United States Patent

Kamiyama et al.

Patent Number: 6,054,180

Date of Patent: *Apr. 25, 2000

[54] METHOD FOR IMPREGNATING A TUBULAR RESIN-ABSORBABLE LINER WITH RESIN

[75] Inventors: Takao Kamiyama, Hiratsuka; Yasuhiro Yokoshima, Ibaraki-ken; Shigeru Endoh, Yasato-machi; Hiroyuki Aoki, Tokorozawa, all of Japan

[73] Assignees: Shonan Gosei-jushi Seisakusho K.K., Kanagawa-ken; Yokoshima & Company; GET Inc., both of Ibaraki-ken; OAR Company, Saitama-ken, all of Japan

[*] Notice: This patent issued on a continued prosecution application filed under 37 CFR 1.53(d), and is subject to the twenty year patent term provisions of 35 U.S.C. 154(a)(2).

[21] Appl. No.: 09/040,591

[22] Filed: Mar. 18, 1998

[30] Foreign Application Priority Data

Mar. 18, 1997 [JP] Japan ................................. 9-064207

[51] Int. Cl.[7] ................................. B05D 7/22; B32B 1/08
[52] U.S. Cl. ...................... 427/238; 156/287; 427/385.5
[58] Field of Search ................................ 427/238, 385.5; 156/287

[56] References Cited

U.S. PATENT DOCUMENTS 5,348,764  9/1994  Yokoshima et al. ..................... 427/238
5,354,586  10/1994 Yokoshima et al. ..................... 427/238

*Primary Examiner*—Janyce Bell
*Attorney, Agent, or Firm*—Whitham, Curtis & Whitham

[57] ABSTRACT

A method for impregnating a resin-absorbable tubular liner with a hardenable liquid resin: (a) a hose is connected to a vacuum pump; (b) the hose is inserted into the liner in a manner such that the open end of the hose comes close to, but sufficiently distant from, one end of the liner; (c) the other end of the tubular liner is closed over the hose in a manner such that the hose can freely slide through the closed end of the tubular liner; (d) a predetermined amount of the hardenable liquid resin is injected into the tubular liner through the open end of the tubular liner; (d') the open end of the tubular liner is substantially closed by placing it between a pair of rollers; and (e) the vacuum pump is operated to evacuate the hose while at the same time the hose and/or the resin-absorbable tubular liner are moved in a manner such that the length of the hose inside the liner is reduced.

20 Claims, 5 Drawing Sheets

METHOD FOR IMPREGNATING A TUBULAR RESIN-ABSORBABLE LINER WITH RESIN

BACKGROUND OF THE INVENTION

1. Field of the Invention

The present invention relates to a method for impregnating a resin-absorbable tubular liner with resin, which is performed as a step in the manufacturing of a tubular liner assembly to be used in lining of a tubular conduit.

2. Description of the Prior Art

When an underground pipe, such as pipelines and passageways, becomes defective or too old to perform properly, the pipe is repaired and rehabilitated without digging the earth to expose the pipe and disassembling the sections of the pipe. This non-digging method of repairing an underground pipe has been known and practiced commonly in the field of civil engineering. Typically, the method is disclosed by Japanese Provisional Patent Publication (Kokai) No. 60-242038.

According to this publication, this method of pipe mending comprises inserting a sufficiently long tubular flexible liner bag into the pipe to be repaired by means of a pressurized fluid, such as air and water. The tubular liner bag is made of a flexible resin-absorbable cloth material impregnated with a thermosetting (heat-curable) liquid resin, and has the outer surface covered with an impermeable plastic film.

More particularly, according to the publication, the tubular flexible liner bag is very long and closed at one end and open at the other. The tubular flexible liner bag is first flattened, then, the open end of it is made to gape wide and hooked (anchored) at one end of the defective or old pipe in a manner such that the wide-opened end of the liner bag completely and fixedly covers and closes the pipe end; a portion of the liner bag is pushed into the pipe whereby an annular pocket is made; then, a pressurized fluid is applied to the pocket portion of the tubular liner bag such that the fluid urges the tubular liner bag to enter the pipe. Since one end of the tubular liner bag is hooked at the end of the pipe, it remains there while the rest of the flexible liner bag proceeds deeper in the pipe as it is turned inside out. (Hereinafter, this manner of insertion shall be called "everting" or "eversion".) When the entire length of the tubular liner bag is everted (i.e., turned inside out) into the pipe, the everted tubular liner bag is pressed against the inner wall of the pipe by the pressurized fluid or by an inflatable pressure bag later introduced into the pipe, and the tubular flexible liner bag is hardened as the thermosetting liquid resin impregnated through the thickness of the liner bag is heated, which is effected by heating the pressurized fluid filling the tubular liner bag by means of a hot steam, etc. Thereafter the closed end of the liner bag is cut off. It is thus possible to line the inside wall of the defective or old pipe with a rigid liner without digging the ground and disassembling the pipe sections.

Now, in manufacturing a tubular liner assembly to be used in such a pipe lining method as described above, the resin-absorbable tubular liner made from a nonwoven fabric, whose outer surface is air-tightly covered with a polymeric film, is soaked with an uncured curable liquid resin such as unsaturated polyester resin; and as a method for effecting this soaking of the resin-absorbable tubular liner with the resin, there is proposed a procedure as disclosed in U.S. Pat. No. 4,366,012.

According to this patent: a required amount of hardenable (curable) resin is injected into the hollow of the resin-absorbable tubular liner; and a window is made open through the film covering the outer surface of the resin-absorbable tubular liner; and the air is drawn out of the resin-absorbable tubular liner through this window while the resin-absorbable tubular liner is passed between a pair of squeeze means to thereby push the hardenable resin toward the window, which promotes progressive soaking of the resin-absorbable tubular liner with the hardenable resin; then, when the advancing resin nears the window, the window is closed by means of patches, etc., and a new window is made open at a location downstream to the closed window, and the same operation as described above is repeated. This repetition is continued until the entire length of the resin-absorbable tubular liner is soaked with the hardenable liquid resin.

PROBLEMS THE INVENTION SEEKS TO SOLVE

However, in the above-described resin impregnation method, it is necessary to make windows through the film covering the outer surface of the resin-absorbable tubular liner, and close them later with patches, etc., so that a skilled person must always attend the operation and while the windows are made open or closed, the sucking of the air and squeezing of the liner must be suspended and thus the operation cannot be conducted continuously and the operation efficiency is poor; furthermore, depending on the material of the film (e.g., nylon, polyester, ethylenevinyl alcohol), adhesiveness of the patches to the film is not sufficient and it has been difficult to close the windows securely.

Also, when the resin-absorbable tubular liner is evacuated, the degree of vacuum is the highest in the vicinity of the window at which the air is drawn out, and farther from the window one goes, the lower is the degree of vacuum he finds, so that the hardenable resin is not uniformly absorbed in the resin-absorbable tubular liner, especially with respect to the lengthwise direction of the liner.

SUMMARY OF THE INVENTION

The present invention was made in view of the above problems and others, and it is, therefore, an object of the invention to provide a new method for impregnating a resin-absorbable tubular liner with resin, with which it is not necessary to make windows in the film, and so it is possible to continuously impregnate the entire length of the resin-absorbable tubular liner with the hardenable resin with a high uniformity with respect to the lengthwise direction of the liner, whereby the operation efficiency is significantly improved.

MEANS TO SOLVE THE PROBLEMS

In order to solve the above problems and others, there is proposed a method for impregnating a hollow resin-absorbable tubular liner with a hardenable liquid resin, wherein an outside face of the resin-absorbable tubular liner is hermetically covered with a film; the method comprises the steps of: (a) preparing an air-tight hose, which has one end open and the other end in pneumatic communication with a vacuum create means; (b) bringing the open end of the hose inside the resin-absorbable tubular liner to a location substantially distant from a first end of the tubular liner at which end the hose is absent, so that the tubular liner is partially penetrated by the hose; (c) closing a second end of the tubular liner, through which the hose extends, in a manner such that the hose is closely contacted by the second end of the tubular liner but can freely slide therethrough; (d)

injecting a predetermined amount of the hardenable liquid resin into the tubular liner through the first end of the tubular liner, the predetermined amount being such an amount that can sufficiently soak the entire length of the resin-absorbable tubular liner; and (e) causing the vacuum create means to evacuate the hose while at the same time the hose and/or the resin-absorbable tubular liner are moved in a manner such that the length of the hose inside the liner is reduced.

In a preferred embodiment of the invention, the first end of the tubular liner is closed immediately after the step (d), described above.

It is more preferred that, after the step (d), the first end of the tubular liner is closed by being inserted into a constriction means, and at the step (e) the resin-absorbable tubular liner is moved as it is passed through the constriction means in a direction away from the open end of the hose.

The constriction means is preferably a pair of self-moving rollers.

In a still more preferred embodiment, the resin-absorbable tubular liner is flattened by the rollers and the thickness of the flattened liner is roughly regulated to a constant value by means of the rollers.

It is preferable that the air-tight hose is partially wound round a reel means, so that the moving of the hose is effected as the reel means takes in the hose.

It is also preferable that the resin-absorbable tubular liner is placed on a conveyor means whereby the movement of the liner is facilitated.

In a recommended mode of the invention, at step (b) the hose is first passed into the tubular liner to entirely penetrate the same, and then the hose is withdrawn until the open end of the hose is brought to the location substantially distant from the first end of the tubular liner.

Finally, it is a better embodiment wherein an outside face of the resin-absorbable tubular liner is hermetically covered with a film in a manner such that the film extends slightly beyond a second end of the resin-absorbable tubular liner; and at the step (c) the second end of the tubular liner is closed in a manner such that the hose is closely contacted by the slightly extending portion of the film but can freely slide therethrough.

EFFECTS OF THE INVENTION

Thus, according to the invention, the tubular liner and/or the hose inserted in the tubular liner are moved in a manner such that the hose is gradually pulled out the tubular liner so that the resin-absorbable tubular liner is evacuated of air progressively from one end to the other, and thus the impregnation with the thermosetting resin develops from one end to the other automatically, and as the result, it becomes unnecessary to break the film to make windows and thus it now becomes possible to continuously impregnate the entire length of the resin-absorbable tubular liner with the hardenable liquid resin with a high uniformity with respect to the lengthwise direction of the liner. Hence, the operation efficiency is significantly improved.

The above and other objects and features of the invention will appear more fully hereinafter in the following description given in connection with the accompanying drawings and the novelty thereof pointed out in the appended claims.

EMBODIMENT

Next, an embodiment of the invention will be described with reference to the attached drawings.

Figure 1:
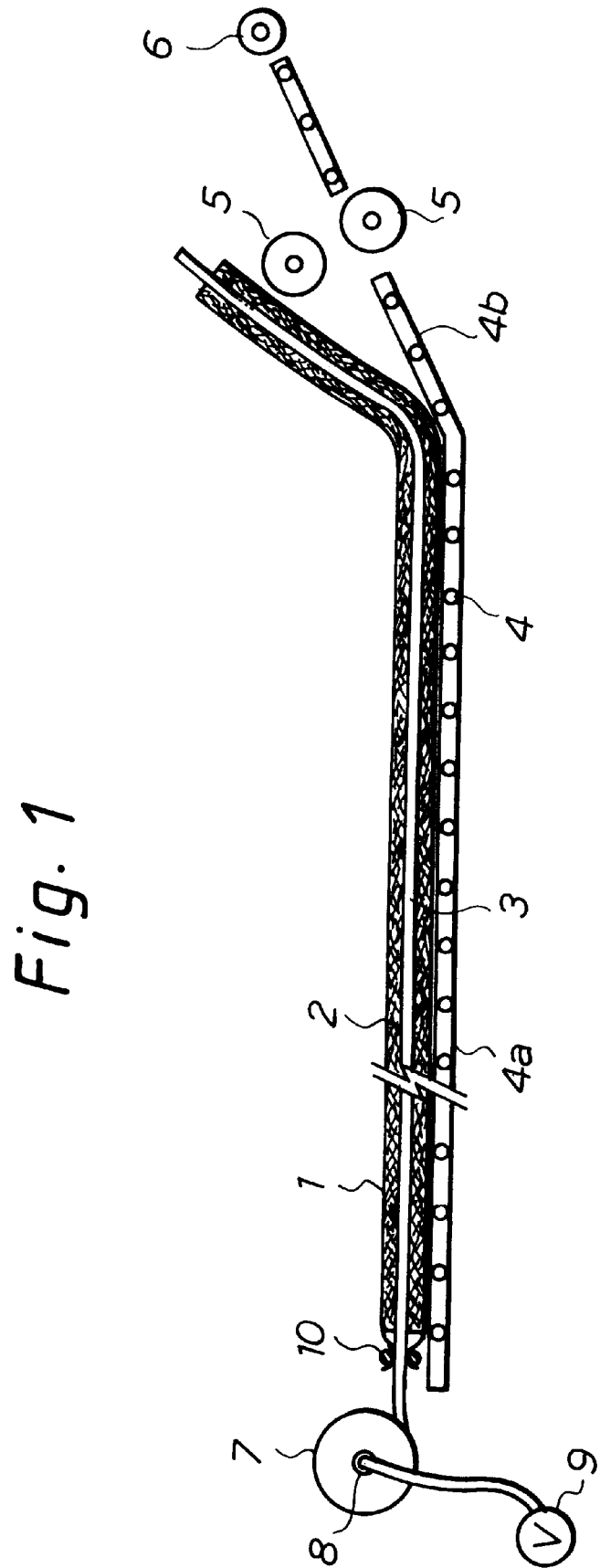
FIG. 1 is a sectional view showing a step of the method of the present invention to impregnate a resin-absorbable tubular liner with a resin.
Figure 2:
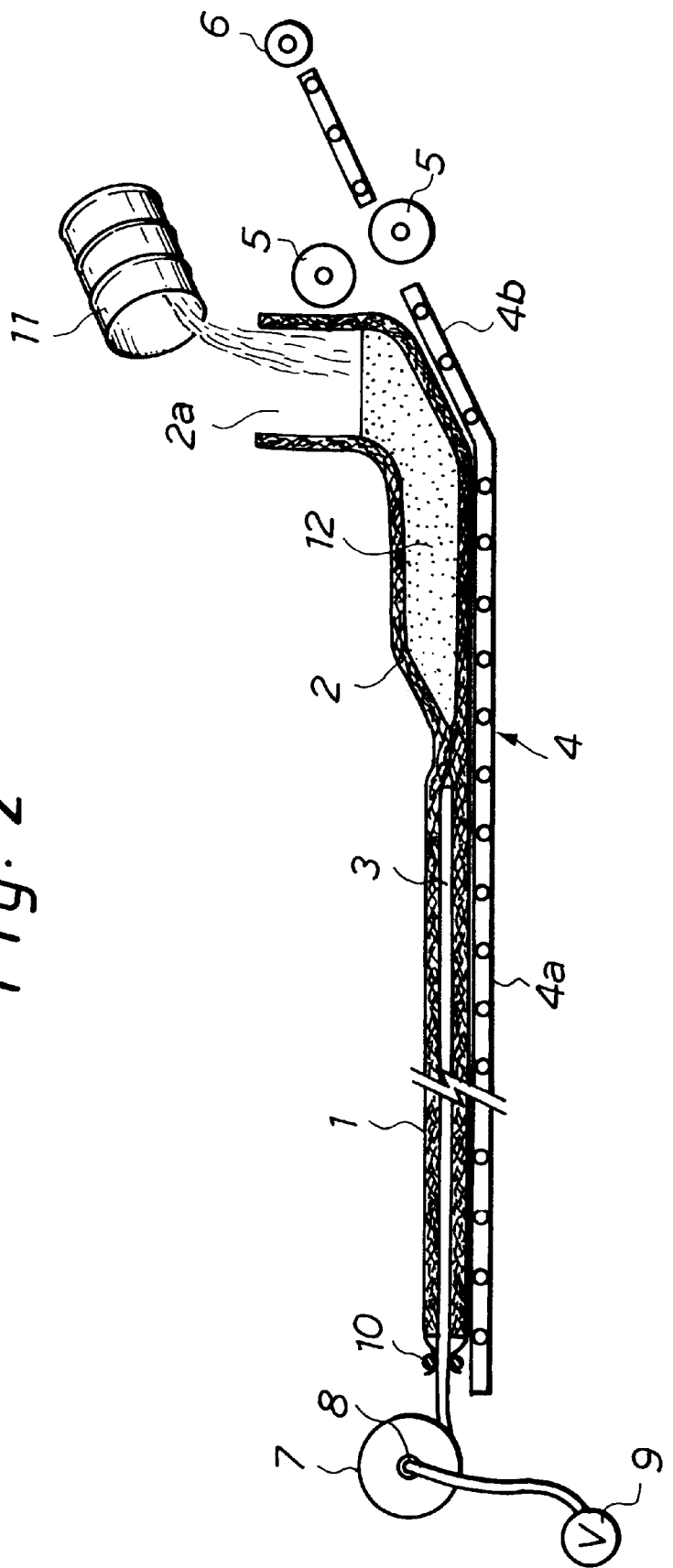
FIG. 2 is a sectional view showing still another step of the method of the present invention to impregnate a resin-absorbable tubular liner with a resin.
Figure 3:
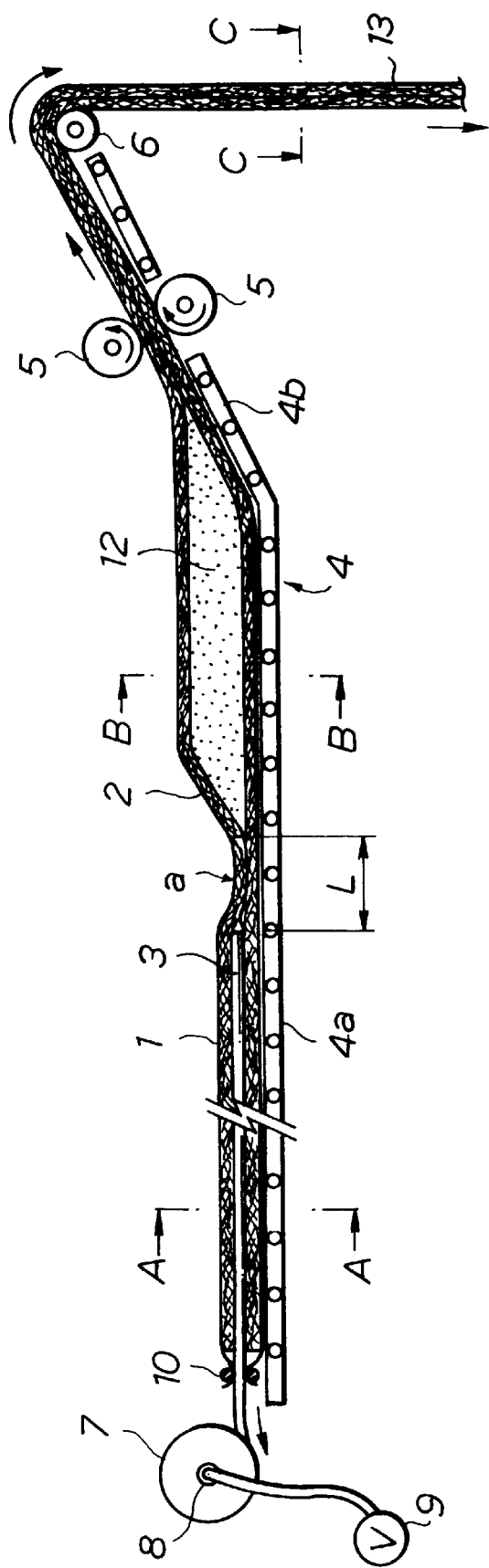
FIG. 3 is a sectional view showing another step of the method of the present invention to impregnate a resin-absorbable tubular liner with a resin.
Figure 4:
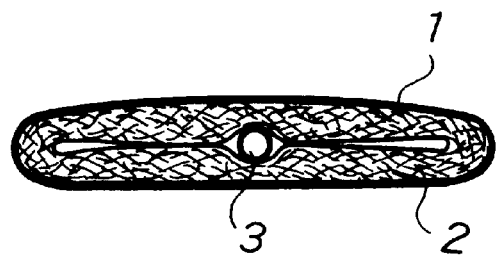
FIG. 4 is an enlarged view of a section taken along the line A—A of FIG. 3.
Figure 5:
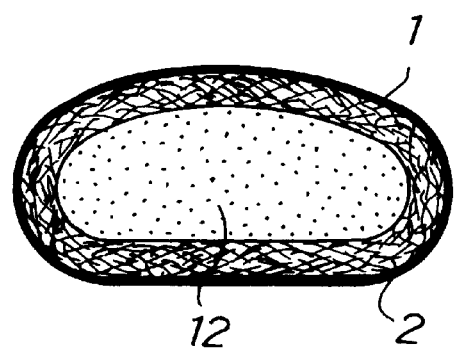
FIG. 5 is an enlarged view of a section taken along the line B—B of FIG. 3.
Figure 6:
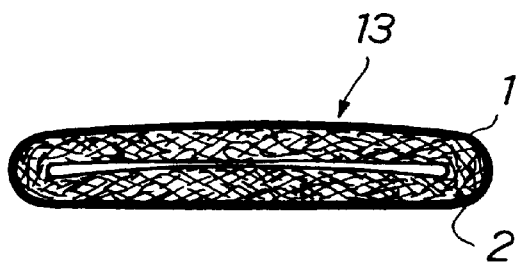
FIG. 6 is an enlarged view of a section taken along the line C—C of FIG. 3.

FIGS. 1 through 3 are sectional views progressively showing steps of the resin impregnation method of the present invention; FIG. 4 is an enlarged cross sectional view taken on line A—A of FIG. 3; FIG. 5 is an enlarged cross sectional view taken on line B—B of FIG. 3; and FIG. 6 is an enlarged cross sectional view taken on line C—C of FIG. 3.

In the method of the present invention, as shown in FIG. 1, the outer surface of the resin-absorbable tubular liner 2 is covered with a highly air-tight polymeric film 1, and a vacuum hose 3 is passed inside the resin-absorbable tubular liner 2 to penetrate the entire length thereof; then, the resin-absorbable tubular liner 2 penetrated by the vacuum hose 3 is laid and set on a roller conveyor 4.

This roller conveyor 4 has a horizontal portion 4a and a sloping portion 4b, and a part of the sloping portion 4b is removed to form a space where a lower one of a pair of gap adjustment rollers 5 is positioned, and a transportation roller 6 is installed at an upper end of the sloping portion 4b.

On the other hand, a hose reel 7 is provided near one end of the roller conveyor 4 (the left end of the horizontal portion 4a, as seen in FIG. 1), and the vacuum hose 3 is wound around this hose reel 7. A vacuum pump 9 is connected to one end of an axis of the hose reel 7 via a swivel joint 8; thus, the vacuum hose 3 is in communication with the vacuum pump 9 via the swivel joint 8.

The polymeric film 1 extends slightly beyond the left end, as viewed in FIG. 1, of the resin-absorbable tubular liner 2, and this extra portion of the film 1 is constricted by an annular rubber band 10 against the vacuum hose 3, which extends from the left end of the resin-absorbable tubular liner 2, in a manner such that the film 1 contacts the outer surface of the vacuum hose 3 air-tightly and slidably.

Now, the resin-absorbable tubular liner 2 is made of a nonwoven fabric of a fiber or a mixture of fibers, selected from fibers of polyester, acrylic resin, polypropylene, nylon, glass, and carbon. The polymeric film 1, with which the outer face of the tubular liner 2 is covered, is made of a material or a mixture of materials such as polyethylene, ethylenevinyl alcohol, nylon, and polyester.

As shown in FIG. 1, when the resin-absorbable tubular liner 2, internally penetrated by the vacuum hose 3, is set on the roller conveyor 4, the vacuum pump 9 is started and at the same time the hose reel 7 is turned to take in a certain length of the vacuum hose 3, whereby the hose 3 is caused to slide within the tubular liner 2. As the result, that end portion of the tubular liner 2 which is remote from the hose reel 7 becomes devoid of the vacuum hose 3. Then, this end portion of the resin-absorbable tubular liner 2 is evacuated by means of the vacuum hose 3, and the air contained in this region is sucked away.

Next, that end of the resin-absorbable tubular liner 2 which is remote from the hose reel 7 is opened wide to make a resin charge port 2a, and a predetermined amount of thermosetting resin 12 is poured from a drum can 11 into the hollow of the resin-absorbable tubular liner 2 via the resin input port 2a, said predetermined amount being such an amount that can sufficiently soak the entire length of the resin-absorbable tubular liner 2. As the result, that portion of the resin-absorbable tubular liner 2 which is evacuated (that portion where the vacuum hose 3 is absent, i.e., the right end portion, as seen in FIG. 2) gets impregnated with the thermosetting resin 12. Incidentally, the thermosetting resin 12 can be an unsaturated polyester resin, an epoxy resin, etc.

When one end portion of the resin-absorbable tubular liner 2 is impregnated with the thermosetting resin 12, as described above, that portion of the resin-absorbable tubular liner 2 which is now impregnated with the thermosetting resin 12 is passed between the gap adjustment rollers 5 in the directions of the arrows (rightward as seen in FIG. 3), whereby the thickness of the now flattened resin-absorbable tubular liner 2 is adjusted, as shown in FIG. 3. This passing of the tubular liner 2 is effected as the roller conveyor 4 is operated to convey the tubular liner 2 up along the sloping portion 4b of the roller conveyor 4. Now, the hose reel 7 being stationary and the vacuum hose 3 being withheld by the vacuum reel 7, more and more of the resin-absorbable tubular liner 2 is rid of the vacuum hose 3, as the tubular liner 2 is conveyed, and thus a constricted location of the tubular liner 2 (the location a in FIG. 3) which occurs in the vicinity of the open end of the vacuum hose 3, where the tubular liner is most strongly evacuated of air and thus the soaking with the thermosetting resin 12 occurs most effectively, moves toward the rubber band 10 where the tubular liner 2 is sealed.

Thus, as this operation is continued, and when the location a reaches the sealed end of the resin-absorbable tubular liner 2, the entire length of the tubular liner 2 is soaked with the thermosetting resin 12. The entire length of the tubular liner 2 impregnated with the liquid resin 12 is also entirely passed between the gap adjustment rollers 5 whereby the thickness is evenly controlled, as described above, and the tubular liner 2 is transported downward from the transportation roller 6.

Incidentally, the hose reel 7 is occasionally operated to take in the vacuum hose 3 lest the vacuum hose 3 should suck in the thermosetting resin 12; this is conducted in a manner such that a distance L between the open end of the vacuum hose 3 and that end of the constricted location a which is farthest from the vacuum hose 3 is always maintained at a discreet amount, as shown in FIG. 3.

When the entire length of the resin-absorbable tubular liner 2 is impregnated with the thermosetting resin 12, as described above, a tubular liner assembly 13 as shown in FIG. 6 is obtained, and in the impregnation method of this invention, the vacuum hose 3 and the tubular liner 2 are moved in a manner such that, relatively speaking, the penetrating vacuum hose 3 is gradually pulled off the tubular liner 2 so that the resin-absorbable tubular liner 2 is evacuated of air progressively from one end to the other, and thus the impregnation with the thermosetting resin 12 develops from one end to the other automatically, and as the result, it becomes unnecessary to break the polymeric film 1 to make windows and thus it becomes possible to continuously impregnate the entire length of the resin-absorbable tubular liner with the hardenable liquid resin with a high uniformity with respect to the lengthwise direction of the liner. Consequently, the operation efficiency is significantly improved.

Next will be described a method for lining a pipe with the tubular liner assembly 13, show in FIG. 6, in which is impregnated the thermosetting resin 12, with reference to FIG. 7 and FIG. 8. Incidentally, FIG. 7 and FIG. 8 are cross sectional views showing how the pipe lining method is conducted.

Figure 7:
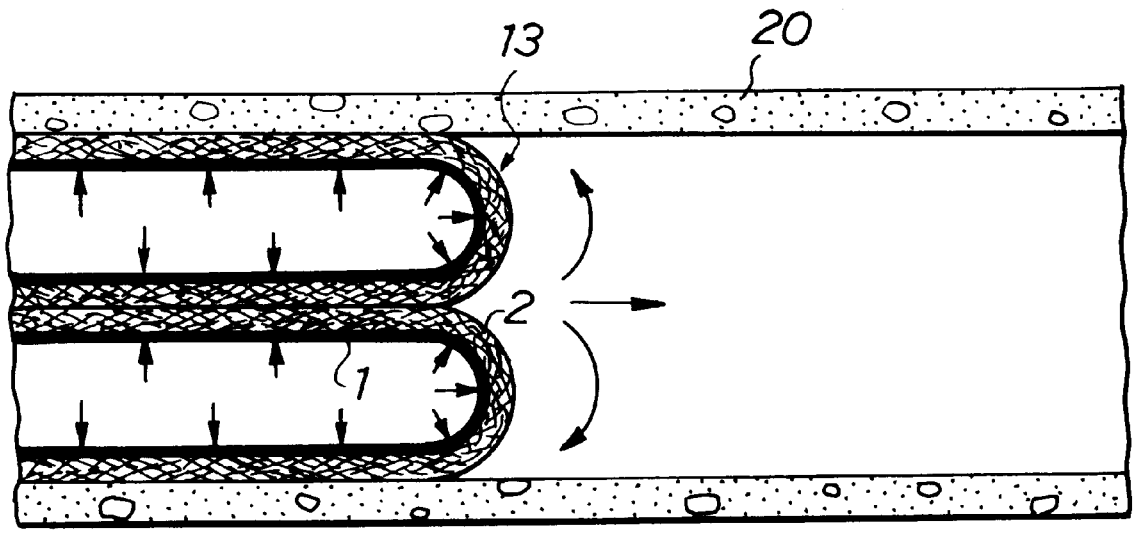
FIG. 7 is a cross sectional view showing how the pipe lining method is conducted.
Figure 8:
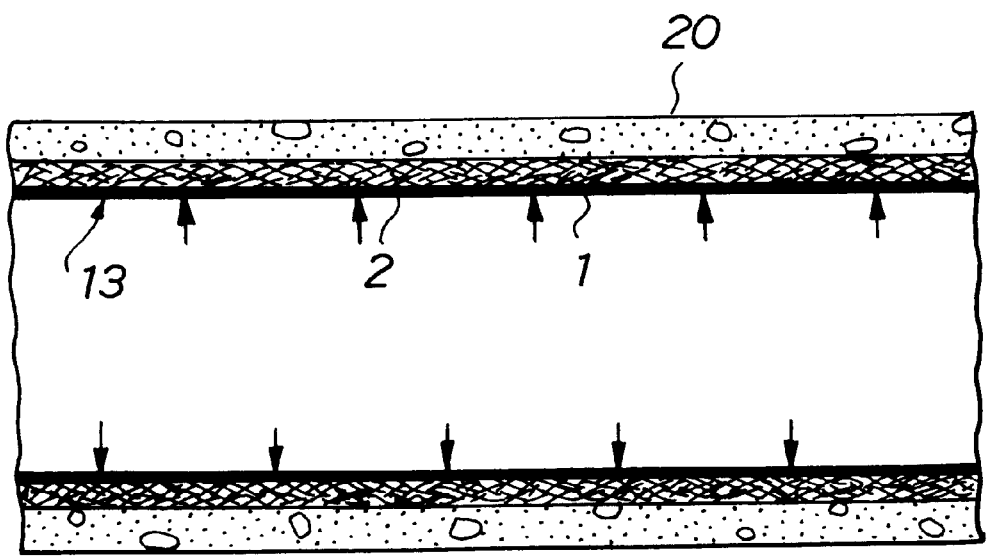
FIG. 8 is another cross sectional view showing how the pipe lining method is conducted.

In FIG. 7 and FIG. 8, the reference numeral 20 designates an aged pipeline such as a sewer conduit; a tubular liner assembly 13 is being everted under fluid pressure such as compressed air, as shown in FIG. 7. By the way, the outer diameter of the tubular liner assembly 13 is designed to be 3 to 25% smaller than the inner diameter of the pipeline 20, and the extensional rigidity of the resin-absorbable tubular liner 2 is designed to be such that when inflated under a fluid pressure of 0.1 to 1 kg/cm$^2$, the tubular liner assembly 13 closely fits to the inner wall of the pipeline 20.

Hence, when the tubular liner assembly 13 is everted into the pipeline 20, the resin-absorbable tubular liner 2 of the tubular liner assembly 13 closely fits to the inner wall of the pipeline 20, and the polymeric film 1, which was on the outside face of the resin-absorbable tubular liner 2 before eversion, turns to be on the inside face of the resin-absorbable tubular liner 2, and thus seals the inner face of the tubular liner assembly hermetically.

Thus, when the tubular liner assembly 13 is everted through the entire length of the pipeline 20, the tubular liner assembly 13 is heated with a heating medium such as hot water, hot air, and steam, while the tubular liner assembly 13 is kept inflated and pressed against the inner wall of the pipeline 20 by means of a fluid pressure, as shown in FIG. 8; then, the thermosetting resin 12 impregnated in the resin-absorbable tubular liner 2 of the tubular liner assembly 13 is cured by heat and consequently the inner wall of the pipeline 20 is lined with the hardened tubular liner assembly 13, and hence the aged pipeline 20 is repaired.

While the invention has been described in its preferred embodiment, it is to be understood that modifications will occur to those skilled in the art without departing from the spirit of the invention. The scope of the invention is therefore to be determined solely by the appended claims.

What is claimed is:

1. A method for impregnating a resin-absorbable tubular liner with a hardenable liquid resin, wherein an outside face of the resin-absorbable tubular liner is hermetically covered with a film, the method comprising the steps of:

(a) preparing an air-tight hose, which has one end open and the other end in pneumatic communication with a vacuum create means;

(b) bringing the open end of the hose inside the resin-absorbable tubular liner to a location substantially distant from a first end of the resin-absorbable tubular liner at which end the hose is absent, so that the tubular liner is partially penetrated by the hose;

(c) closing a second end of the resin-absorbable tubular liner, through which the hose extends, in a manner such that the hose is closely contacted by the second end of the resin-absorbable tubular liner but can freely slide therethrough;

(d) injecting a predetermined amount of the hardenable liquid resin into the resin-absorbable tubular liner through the first end of the resin-absorbable tubular liner, the predetermined amount being such an amount that can sufficiently soak the entire length of the resin-absorbable tubular liner;

(e) closing the first end of the tubular liner after step (d); and (f) causing the vacuum create means to evacuate the hose while at the same time the resin-absorbable tubular liner is moved in a manner such that the length of the hose inside the liner is reduced.

2. The method as recited in claim 1, wherein at step (f), in addition to the resin-absorbable tubular liner being moved, the hose is moved in a manner such that the length of the hose inside the liner is reduced.

3. The method as recited in claim 2, wherein the first end of the tubular liner is closed by being inserted into a constriction means, and at the step (f) the resin-absorbable tubular liner is moved as it is passed through said constriction means in a direction away from the open end of said hose.

4. The method as recited in claim 3, wherein said constriction means consists of a pair of self-moving rollers.

5. The method as recited in claim 4, wherein the resin-absorbable tubular liner is flattened by the rollers and the thickness of the flattened liner is roughly regulated to a constant value by means of the rollers.

6. The method as recited in claim 1 wherein said air-tight hose is partially wound round a reel means, so that the moving of said hose is effected as the reel means takes in the hose.

7. The method as recited in claim 1 wherein said resin-absorbable tubular liner is placed on a conveyor means whereby the movement of the liner is facilitated.

8. The method as recited in claim 1 wherein at step (b) the hose is first passed into the tubular liner to entirely penetrate the same, and then the hose is withdrawn until the open end of said hose is brought to the location substantially distant from the first end of said tubular liner.

9. A method for impregnating a resin-absorbable tubular liner with a hardenable liquid resin, wherein an outside face of said resin-absorbable tubular liner is hermetically covered with a film in a manner such that the film extends slightly beyond a second end of the resin-absorbable tubular liner; said method comprising steps of: (a) preparing an air-tight hose, which has one end open and the other end in pneumatic communication with a vacuum create means; (b) bringing the open end of said hose inside said resin-absorbable tubular liner to a location substantially distant from a first end of said tubular liner at which end the hose is absent, so that the tubular liner is partially penetrated by said hose; (c) closing the second end of said tubular liner, through which said hose extends, in a manner such that the hose is closely contacted by said slightly extending portion of the film but can freely slide therethrough; (d) injecting a predetermined amount of the hardenable liquid resin into the tubular liner through said first end of the tubular liner, said predetermined amount being such an amount that can sufficiently soak the entire length of the resin-absorbable tubular liner; and (e) causing said vacuum create means to evacuate the hose while at the same time the hose and/or the resin-absorbable tubular liner are moved in a manner such that the length of the hose inside the liner is reduced.

10. The method as recited in claim 9, wherein the hose is closely contacted by said slightly extending portion of the film after closing the second end of the tubular liner.

11. The method as recited in claim 9, wherein the hose freely slides through the closed second end of the tubular liner.

12. A method for impregnating a resin-absorbable tubular liner with a hardenable liquid resin, the resin-absorbable tubular liner having an outer face hermetically covered with a film and further having open ends, the method comprising steps of:

(a) placing a vacuum hose through the open ends of the resin-absorbable tubular liner;

(b) constricting an open end of the resin-absorbable tubular liner about the vacuum hose such that the vacuum hose is slidable within the resin-absorbable tubular liner;

(c) retracting the vacuum hose within the resin-absorbable tubular liner to a location distant from the other open end of the resin-absorbable tubular liner;

(d) injecting a predetermined amount of the hardenable liquid resin into the resin-absorbable tubular liner through the other open end of the resin-absorbable tubular liner, the predetermined amount being such an amount that can sufficiently soak the entire length of the resin-absorbable tubular liner;

(e) flattening the resin-absorbable tubular liner; and (f) periodically retracting the vacuum hose.

13. The method as recited in claim 12, further comprising opening the other end of the resin-absorbable tubular liner in order to form a resin charge port.

14. The method as recited in claim 13, wherein the injecting a predetermined amount of the hardenable liquid resin is injected into the resin charge port.

15. The method as recited in claim 12, further comprising sucking away air within the resin-absorbable tubular liner at portions devoid of the vacuum hose.

16. The method as recited in claim 12, wherein the flattening step includes passing the other end of the resin-absorbable tubular liner between gap adjustment rollers.

17. The method as recited in claim 16, further comprising holding the vacuum hose stationary while the resin-absorbable tubular liner is passed through the gap adjustment rollers.

18. The method as recited in claim 16, further comprising periodically retracting the vacuum hose from the resin-absorbable tubular liner while the resin-absorbable tubular liner is passed through the gap adjustment rollers.

19. The method as recited in claim 18, wherein the vacuum hose is retracted through the constricted open end of the resin-absorbable tubular liner.

20. The method as recited in claim 12, further comprising providing a constricted area in the resin-absorbable material at a vicinity of an open end of the vacuum hose.

* * * * *